(12) United States Patent
Hashizume et al.

(10) Patent No.: US 7,881,669 B2
(45) Date of Patent: Feb. 1, 2011

(54) TIME REFERENCE POINT INFORMATION TRANSMITTING SYSTEM AND RECEIVER

(75) Inventors: Hiromichi Hashizume, Tokyo (JP); Masanori Sugimoto, Chiba (JP)

(73) Assignee: Inter-University Research Institute Corporation/Research Organization of Information and Systems, Tokyo (JP)

( * ) Notice: Subject to any disclaimer, the term of this patent is extended or adjusted under 35 U.S.C. 154(b) by 608 days.

(21) Appl. No.: 11/874,231

(22) Filed: Oct. 18, 2007

(65) Prior Publication Data
US 2008/0273642 A1    Nov. 6, 2008

Related U.S. Application Data

(63) Continuation of application No. PCT/JP2006/308212, filed on Apr. 19, 2006.

(30) Foreign Application Priority Data
Apr. 19, 2005    (JP) .............................. 2005-121576

(51) Int. Cl.
*H04B 1/00*    (2006.01)
*H04B 17/00*    (2006.01)
*H04B 1/06*    (2006.01)

(52) U.S. Cl. ........................ 455/42; 455/67.16; 455/231

(58) Field of Classification Search .................... 455/42, 455/23, 39, 60, 67.16, 139, 205, 276.1, 43, 455/67.11, 231
See application file for complete search history.

(56) References Cited

FOREIGN PATENT DOCUMENTS

| JP | 60-218086 A | 10/1985 |
|----|-------------|---------|
| JP | 03-233395 A | 10/1991 |
| JP | 2003-222675 | 8/2003 |
| JP | 06-186328 A | 7/2004 |
| JP | 2004-191145 A | 7/2004 |

OTHER PUBLICATIONS

Written Opinion of ISA, Date Mailed: Jul. 11, 2006 (in Japanese Language), Form PCT/ISA/237.
Written Opinion of IPEA, Date Mailed: Apr. 17, 2007 (in Japanese Language), Form PCT/IPEA/408.
International Preliminary Examination Report, Date Mailed: Jul. 31, 2007 (in Japanese Language), Form PCT/IPEA/416.
Office Action issued Sep. 1, 2010, in Japanese Patent Application No. 2007-528168 filed Apr. 19, 2006 (with English-language translation).

*Primary Examiner*—Eugene Yun
(74) *Attorney, Agent, or Firm*—Oblon, Spivak, McClelland, Maier & Neustadt, L.L.P.

(57) ABSTRACT

A transmitter sets a time length, determines a time point at which phases of frequency signals coincide within a range of the time length, defines a determined time point as a time reference point, aligns the phases of the frequency signals based on the time reference point, combines phase-aligned frequency, and transmits combined frequency signals to a receiver by the time length as the communication signals. The receiver receives the communication signals, extracts the phases of the frequency signals, obtains a time point at which the phases coincide, and determines an obtained time point as the time reference point.

9 Claims, 6 Drawing Sheets

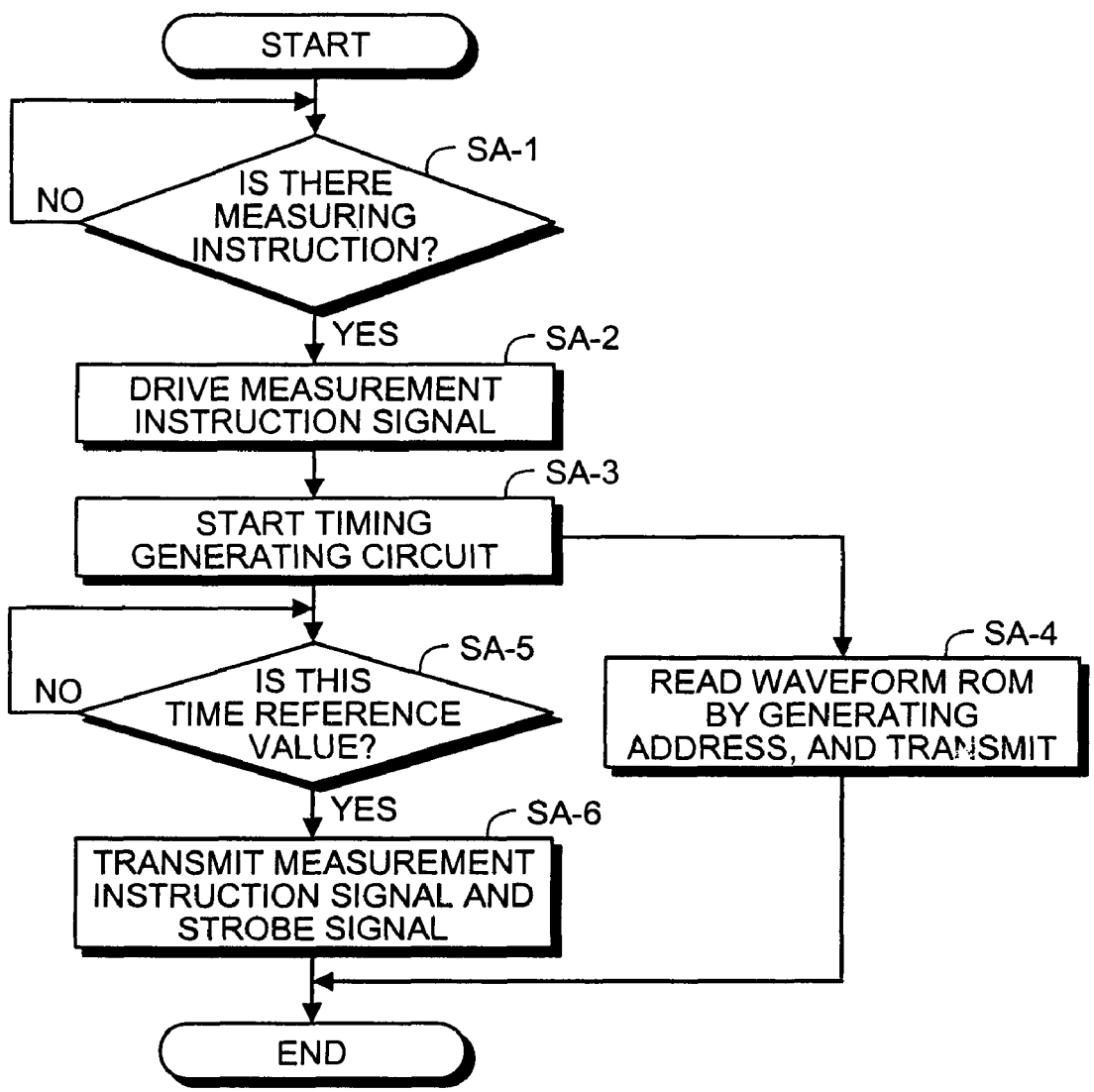

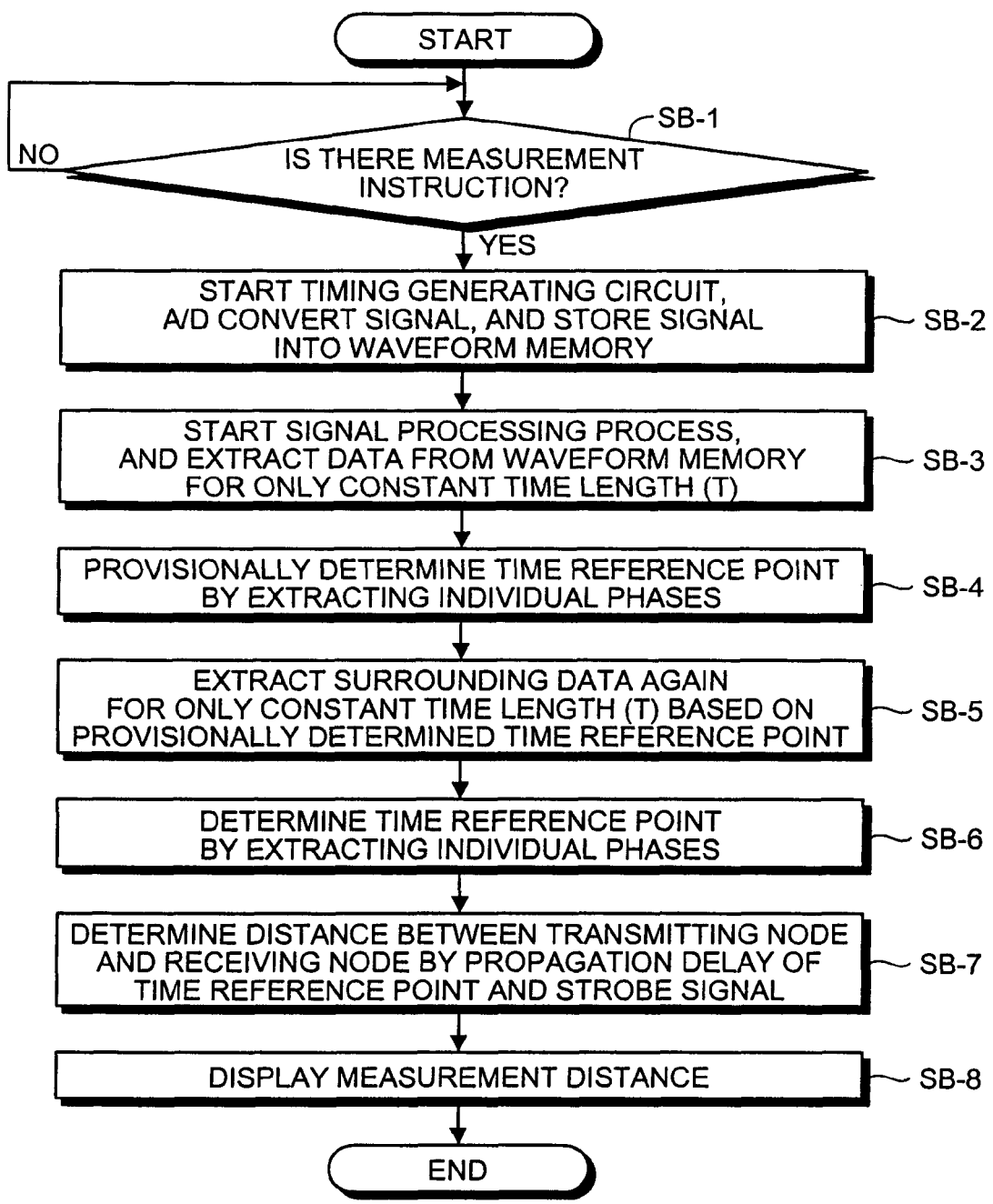

TIME REFERENCE POINT INFORMATION TRANSMITTING SYSTEM AND RECEIVER

CROSS REFERENCE TO RELATED APPLICATIONS

This application is a continuation application of PCT/JP2006/308212, filed Apr. 19, 2006, which claims the benefit of and priority to Japanese Application No. 2005-121576, filed Apr. 19, 2005, the entire contents of each of which are incorporated herein by reference.

BACKGROUND OF THE INVENTION

1. Field of the Invention

The present invention relates to a technology for transmitting information concerning a time reference point from a transmitter to a receiver.

2. Description of the Related Art

In a system that carries out communications and measuring, there are many situations where timing information (corresponding to a time reference point in the present invention) is required to be strictly transmitted and measured at a high speed. For example, in the image communication, there is a situation of synchronizing horizontal and vertical scanning. In the synchronous digital data communication, there is a situation of detecting a timing of changing over bit information. In the measuring, there is a situation of measuring a distance and an angle based on a signal delay time.

In the system that transmits a digitally-modulated information packet, high-speed and highly reliable communications become possible, when a time and an amplitude that become the reference of demodulation can be efficiently and accurately transmitted in plural carrier frequencies.

In the system described above, timing information is transmitted using a wave propagation phenomenon of radio waves that are propagated in space, an optical fiber, a wave guide, or a communication cable, and a wave propagation phenomenon of waves that are propagated in gas, liquid, or a solid.

Assume that a waveform generator, a wave propagation medium, and a waveform receiver that are used in the system have a sufficiently uniform amplitude transmission characteristic and a sufficiently uniform phase transmission characteristic in a wide frequency region. In this case, timing information can be accurately and easily transmitted from the waveform generator to the waveform receiver, by expressing the timing information to be transmitted using a leading edge of a rectangular electric signal pulse or a leading edge of a rectangular ultrasonic burst. Amplitude can be obtained by simply detecting an envelope amplitude.

The electric signal pulse and the ultrasonic burst have a limitless spread in a frequency spectrum. However, the waveform generator, the wave propagation medium, or the waveform receiver actually present has a nonuniform amplitude frequency characteristic and a nonuniform phase frequency characteristic to some extent, and communications are permitted using a frequency of a limited band in many cases. Therefore, a rectangular electric signal pulse and a rectangular ultrasonic burst are deformed at the receiving edge. Particularly, in the communication system that uses a waveform conversion device or a wave propagation medium having a frequency characteristic of a narrow band, and in the remote-distance communication system, it is difficult to strictly transmit timing information, and detection of amplitude is also difficult. Consequently, the information communication speed is limited.

In the field of measuring, there are a radar, a laser measuring device, and an ultrasonic measuring device that measure a distance and an angle based on a signal delay time. Measuring precision of a distance and an angle is directly related to transmission precision (detection precision) of timing information. In other words, the measuring precision of a distance and an angle depends on the transmission precision (detection precision) of timing information. Therefore, in the field of measuring, it is important to accurately (strictly) transmit timing information. For example, there is an ultrasonic distance meter that measures a distance between a transmitter and a receiver by detecting an envelope line leading edge of 40 kHz carrier burst. Distance measuring precision of the ultrasonic distance meter is about a few centimeters to a few tens of centimeters. The ultrasonic distance meter uses a piezoelectric ceramic element for a transmitting and receiving element of an ultrasonic wave. In terms of a speed of wave propagated in the air, the transmission precision of timing information in the ultrasonic distance meter is 0.1 ms to 1 ms. This value is a representative value of precision that can be achieved using an envelope line of a waveform passing through a narrow-band communication path.

The piezoelectric ceramic element used in the ultrasonic distance meter mentioned above has a frequency characteristic of a narrow band. Therefore, the received waveform has a strong distortion. Further, the ultrasonic distance meter uses a region that receives a strong influence of a transient response characteristic of a signal such as a leading edge of the ultrasonic burst. Therefore, a characteristic variation of the transmitting and receiving element easily gives influence to the measuring precision and the transmission precision of timing information. Further, the envelope line of a waveform receives both influences of the amplitude frequency characteristic and the phase frequency characteristic of a transmission path. Therefore, when the transmission path having the above characteristics is used, the shape of the envelope line easily changes, and the transmission precision of timing information has a risk of being decreased as a result.

On the other hand, when timing information can be transmitted using only phase information, transmission precision can be increased from that when the timing information is transmitted using the envelope line. As a result, there is a possibility that measuring and communications can be carried out in higher precision. An angle meter is put into practical use that measures a distance between two points relatively close to each other and that obtains an angle with a signal source from a difference of phases obtained. Further, a micro displacement meter is put into practical use that obtains displacement in a narrow distance, and this micro displacement meter has measuring precision of around 1 mm.

In transmitting timing information using only phase information, a phase needs to be extracted from a cycle phenomenon such as a sinusoidal wave. Because a waveform is repeated in a phase value of $2\pi$ radian (cycle in the case of time, and a wavelength in the case of a distance), a phase obtained at the receiving end becomes a surplus obtained after dividing the absolute value of the phase by $2\pi$ (remainder after dividing the absolute value by $2\pi$. Accordingly, even when a distance is attempted to be measured by extracting a phase, the absolute value of the distance cannot be measured. Specifically, while the wavelength of an ultrasonic wave of 40 kHz is about 8.5 mm in the air (corresponding to $2\pi$ radian of a phase value), only a remainder obtained by dividing the distance by the wavelength of 8.5 mm is obtained and the absolute value of a distance cannot be measured, even when the distance is attempted to be determined by extracting the phase using the ultrasonic wave.

Japanese Patent Application Laid-open No. 2004-191145 is disclosed as an invention according to which an ultrasonic displacement meter using a phase has a measuring range exceeding 8.5 mm corresponding to the wavelength in the air of an ultrasonic wave of 40 kHz. Japanese Patent Application Laid-open No. 2004-191145 discloses a device and a method for obtaining phases $\phi_1$ and $\phi_2$ by carrying out a phase delay measuring twice by changing over between two different frequencies $f_1$ and $f_2$ ($f_1 > f_2$), and converting the method to substantially measure a phase using a frequency of "$f_1$-$f_2$" performing various processes based on the obtained phases $\phi_1$ and $\phi_2$. Specifically, a phase delay is measured by changing over between frequencies of "$f_1$=40 kHz, $f_2$=39 kHz", thereby obtaining the effect of substantially measuring a phase in the carrier of 1 kHz (40 kHz-39 kHz). As a result, an unstable distance of a displacement meter of 8.5 mm using the ultrasonic wave of 40 kHz can be extended to a wavelength 340 mm of a wave of 1 kHz, while maintaining the measuring precision of around 1 mm.

However, according to the conventional technique, while the measuring distance can be extended to 340 mm, uncertainty of timing information remains due to the phase cycle as the problem of the information transmission technique using a phase. Therefore, although displacement can be measured, the absolute value is difficult to measure.

According to the conventional technique, measuring is carried out at plural times by changing over between frequencies. Therefore, a measuring time becomes long, and a transmission time of timing information becomes long. These problems become particularly noticeable when a propagation medium changes due to a move of an object or a variation of a wind direction and a temperature. In this situation, the measuring itself becomes difficult.

SUMMARY OF THE INVENTION

It is an object of the present invention to at least partially solve the problems in the conventional technology.

According to an aspect of the present invention, there is provided a time reference point information transmitting system in which a transmitter transmits information on a time reference point to a receiver through a communication path in which a communication can be performed in a predetermined frequency band. The transmitter includes a frequency-signal generating unit that generates a plurality of frequency signals communicable through the communication path, a phase adjusting unit that determines a time point at which phases of the frequency signals coincide within a range of a set time length obtained by setting a value equal to or smaller than an inverse number of an absolute value of a difference between the two frequency signals from among the frequency signals generated by the frequency-signal generating unit as a length of the time during which the communication signals are transmitted to the receiver, and aligns the phases of the frequency signals based on a defined time reference point, and a transmitting unit that combines the frequency signals of which the phases are aligned by the phase adjusting unit, and transmits combined frequency signals to the receiver by a length of the time as the communication signals. The receiver includes a receiving unit that receives the communication signals transmitted from the transmitter, a phase extracting unit that extracts the phases of the frequency signals contained in the communication signals, based on the communication signals received by the receiving unit, and a time-reference-point determining unit that obtains a time point at which the phases coincide based on the phases extracted by the phase extracting unit, and determines an obtained time point as the time reference point. The time reference point information transmitting system according to the aspect is a time reference point information transmitting system in which a transmitter transmits information concerning a time reference point to a receiver in a communication path in which communications can be carried out in a predetermined frequency band, wherein the transmitter includes a frequency-signal generating unit that generates plural frequency signals which can be communicated in the communication path, a phase adjusting unit that sets a value equal to or smaller than an inverse number of an absolute value of a difference between the two frequency signals out of the plural frequency signals generated by the frequency-signal generating unit as a length of the time during which the communication signals are transmitted to the receiver, determines a time point at which the phases of the frequency signals coincide with each other within the range of the set time length, defines the determined time point as the time reference point, sets the length of the time and a starting time so that the defined time reference point is contained in the communication signals, and arranges the phases of the frequency signals based on the time reference point, and a transmitting unit that combines the plural frequency signals after the phases are arranged by the phase adjusting unit, and transmits the combined plural frequency signals as the communication signals, to the receiver for the time length from the starting time, and the receiver includes a receiving unit that receives the communication signals transmitted from the transmitter, a phase extracting unit that extracts the phases of the frequency signals contained in the communication signals, based on the communication signals received by the receiving unit, and a time-reference-point determining unit that obtains a time point at which the phases coincide with each other based on the plural phases extracted by the phase extracting unit, and determines the obtained time point as the time reference point.

According to another aspect of the present invention, there is provided a receiver that that receives information on a time reference point through a communication path in which a communication can be performed in a predetermined frequency band, the receiver includes: a receiving unit that receives, as communication signals, a plurality of frequency signals, which is combined, of which phases are aligned based on the time reference point defined as a time point at which the phases are in a predetermined relationship; a phase extracting unit that extracts the phases of the frequency signals contained in the communication signals, based on the communication signals received by the receiving unit and an equation defined by $$\begin{pmatrix} 1 & \sin c\left(\frac{\omega_1 - \omega_2}{2}T\right) \\ \sin c\left(\frac{\omega_1 - \omega_2}{2}T\right) & 1 \end{pmatrix} \begin{pmatrix} a_1 e^{jp_1} \\ a_2 e^{jp_2} \end{pmatrix} -$$

$$\begin{pmatrix} \sin c(\omega_1 T) & \sin c\left(\frac{\omega_1 + \omega_2}{2}T\right) \\ \sin c\left(\frac{\omega_1 + \omega_2}{2}T\right) & \sin c(\omega_2 T) \end{pmatrix} \begin{pmatrix} a_1 e^{-jp_1} \\ a_2 e^{-jp_2} \end{pmatrix} = 2j \begin{pmatrix} \langle s(t), e^{j\omega_1 t} \rangle \\ \langle s(t), e^{j\omega_2 t} \rangle \end{pmatrix}$$

where sinc(x) represents a sampling function defined by "sinc(x)=(sinx)/x", $\omega_1$ and $\omega_2$ represent angular frequencies defined by "$\omega_1 = 2\pi f_1$" and "$\omega_2 = 2\pi f_2$", respectively, $f_1$ and $f_2$ represent frequencies of the frequency signals generated by the frequency-signal generating unit, T represents a length of a time for extracting the communication signals, e represents a base of a natural logarithm, j represents an imaginary unit, $p_1$ and $p_2$ represent a phase corresponding to the frequency signal of the frequency $f_1$ and a phase corresponding to the frequency signal of the frequency $f_2$, respectively, s(t) is a function representing a waveform of the communication signals defined as "$s(t)=a_1 \sin(\omega_1 t+p_1)+a_2 \sin(\omega_2 t+p_2)$", $a_1$ and $a_2$ represent an amplitude corresponding to the frequency signal of the frequency $f_1$ and an amplitude corresponding to the frequency signal of the frequency $f_2$, respectively, t represents a variable indicating a time, and $<s(t), e^{j\omega_1 t}>$ and $<s(t), e^{j\omega_2 t}>$ represent an inner product of s(t) and $e^{j\omega_1 t}$ and an inner product of s(t) and $e^{j\omega_2 t}$, respectively; and a time-reference-point determining unit that obtains a time point at which the phases coincide based on the phases extracted by the phase extracting unit, and determines an obtained time point as the time reference point.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of one example of a process performed by the transmitting node shown in FIG. 3; and FIG. 7 is a flowchart of one example of a process performed by the receiving node shown in FIG. 3.

DETAILED DESCRIPTION OF THE PREFERRED EMBODIMENTS

Exemplary embodiments of the present invention will be explained below in detail with reference to the accompanying drawings. Note that the present invention is not limited thereto.

Figure 1:
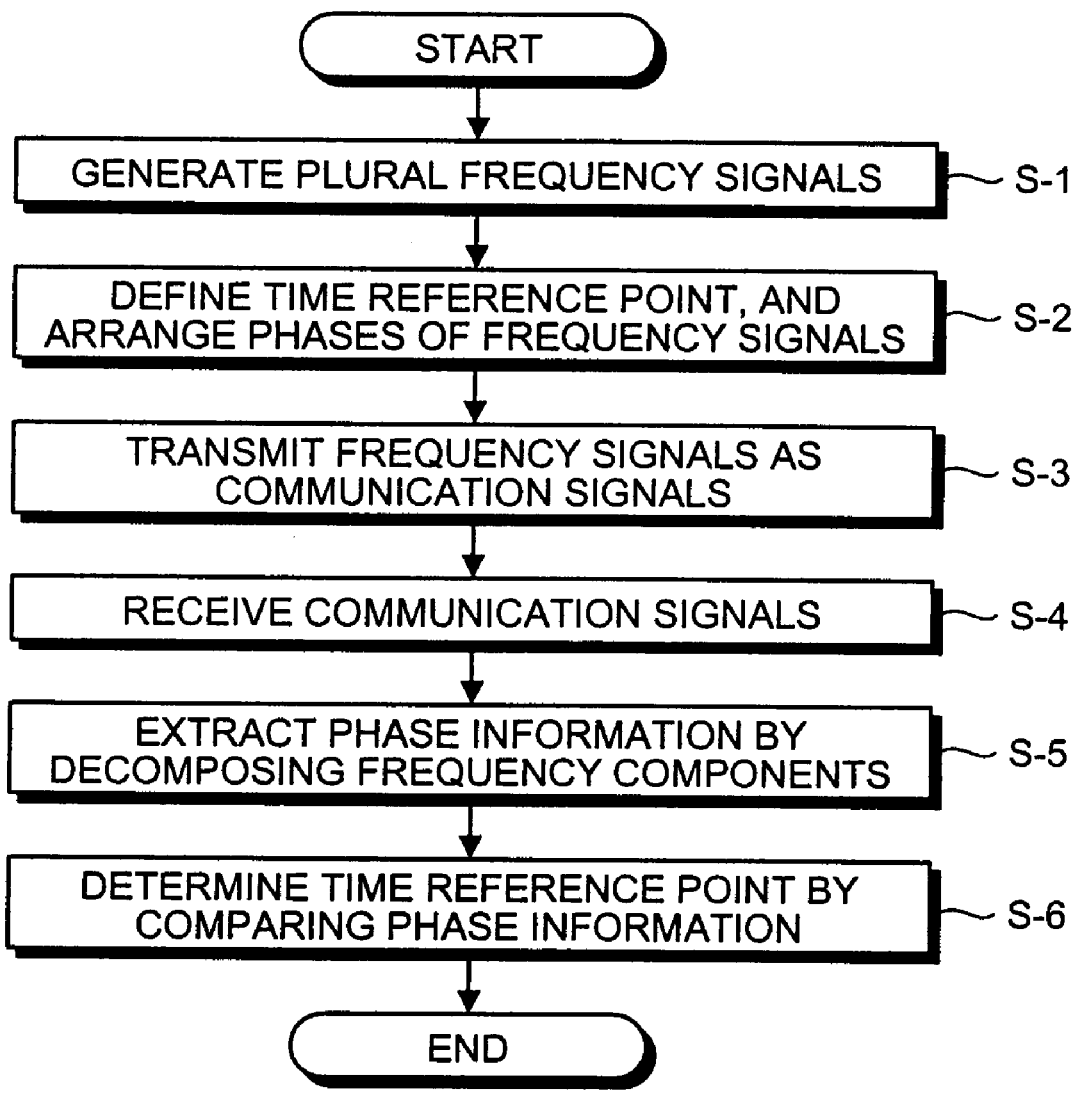
FIG. 1 is a flowchart of the basic principle of a time reference point information transmitting system according to an embodiment of the present invention.

First, the basic principle of the time reference point information transmitting system according to an embodiment of the present invention is explained with reference to FIG. 1. FIG. 1 is a flowchart of the basic principle of the time reference point information transmitting system according to an embodiment of the present invention.

According to the embodiment, a transmitter transmits information concerning a time reference point to a receiver in the following process from step S-1 to step S-6, in a communication path in which communications can be carried out in a predetermined frequency band (for example, a communication path in which a frequency band that can be used for communications is constrained because the phase transmission characteristic and the amplitude transmission characteristic change due to a frequency).

First, the transmitter generates plural frequency signals that can be communicated in a communication path (step S-1: a frequency-signal generating step). Next, the transmitter determines a time point at which phases of the frequency signals are in a predetermined relationship based on the plural frequency signals generated at step S-1, defines the determined time point as the time reference point, and aligns the phases of the frequency signals based on the defined time reference point (step S-2: a phase adjusting step). Specifically, the time point at which the phases of the plural frequency signals generated at step S-1 become in a predetermined condition is defined as the time reference point, and the phases of the plural frequency signals are arranged so that the relationship of the frequency signals matches the predetermined condition.

Figure 2:
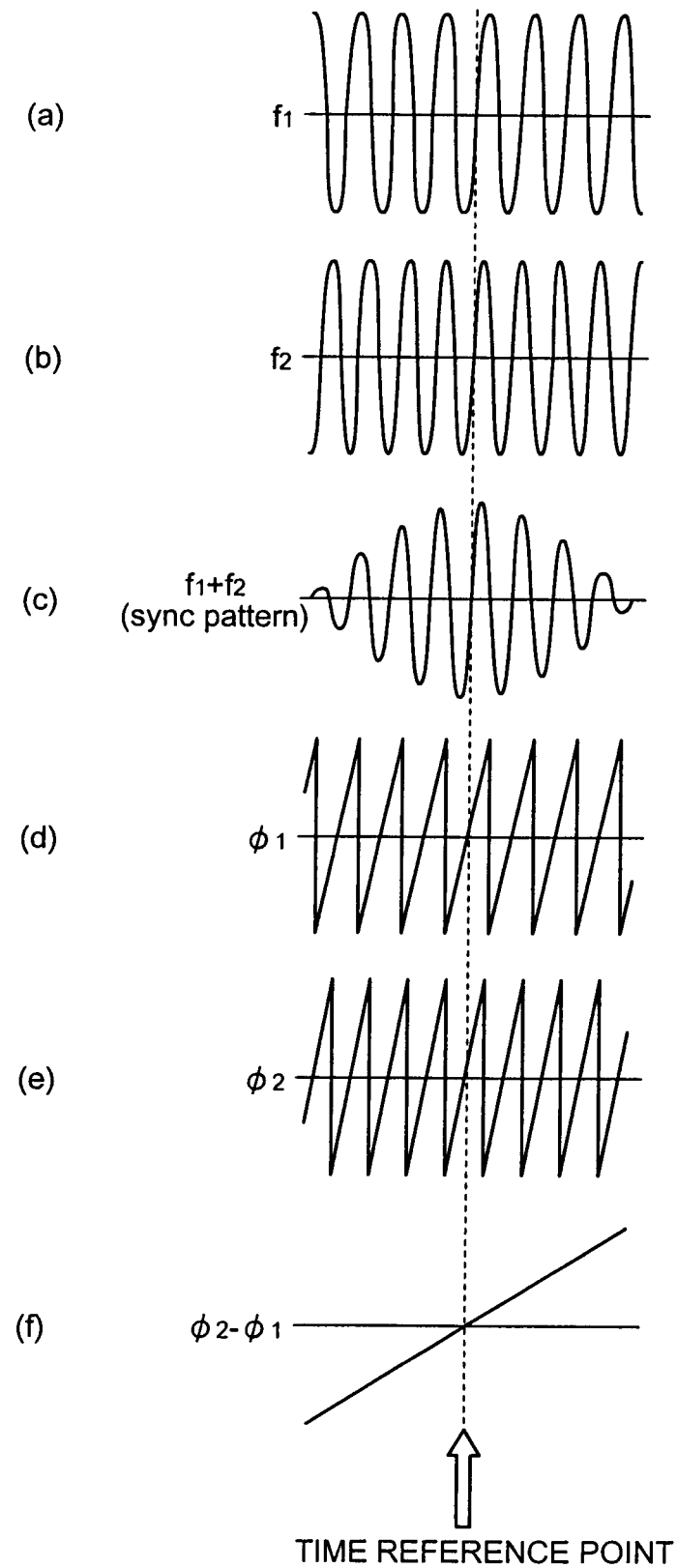
FIG. 2 is one example of a definition of a time reference point.

One example of the definition of the time reference point as a characteristic portion of the embodiment is explained with reference to FIG. 2. FIG. 2 is one example of the definition of the time reference point. One example of generating two frequencies (a frequency $f_1$=39.75 kHz, and a frequency $f_2$=40.25 kHz) at step S-1 is explained here.

When two frequency carriers ((a) and (b) in FIG. 2) are transmitted in superimposition, beat is generated ((c) in FIG. 2). In this case, the cycle of the beat becomes a cycle of a frequency signal of "$f_2-f_1$=0.5 kHz", that is, 2 ms.

Note a phase $\phi_1$ of the carrier of the frequency $f_1$ and a phase $\phi_2$ of the carrier of the frequency $f_2$ (surplus of $2\pi$). When 2 ms as the time from a node to a node of the beat are extracted, the phase $\phi_1$ and the phase $\phi_2$ are reciprocated many times between $-\pi$ radian and $\pi$ radian ((d) and (e) in FIG. 2).

The phase difference "$\phi_2-\phi_1$" passes only once in the range of $-\pi$ radian to $\pi$ radian, and the timing (time) when "$\phi_2-\phi_1 0$" occurs only once during the extracted 2 ms ((f) in FIG. 2).

The timing when "$\phi_2-\phi_1=0$" occurs again is defined as the time reference point.

Referring back to FIG. 1, the transmitter combines the plural frequency signals of which phases are aligned at step S-2, and transmits the combined plural frequency signals to the receiver as communication signals (step S-3: a transmitting step). The plural frequency signals combined at step S-2 (specifically, the phase-arranged frequency signals) can be transmitted to the receiver as communication signals of direct carriers. Alternatively, the combined plural frequency signals can be transmitted to the receiver as communication signals modulated with carriers of other frequency.

The receiver receives the communication signals transmitted from the transmitter (step S-4: a receiving step). When the combined plural frequency signals are transmitted as communication signals of direct carriers, the communication signals of the direct carriers can be received at step S-4. When the combined plural frequency signals are transmitted as communication signals modulated with carriers of other frequency at step S-3, the communication signals modulated with the carriers of other frequency can be received and demodulated at step S-4.

Next, the receiver extracts phases of the frequency signals contained in the communication signals, based on the communication signals received at step S-4 (step S-5: a phase extracting step). In other words, frequency components of the communication signals received at step S-4 are decomposed, and individual pieces of phase information are extracted.

At step S-5, the phases of the frequency signals contained in the communication signals can be extracted based on the received communication signals and Equation (1). In other words, at step S-5, the frequency components of the received communication signals can be decomposed based on Equation (1), and individual phase information can be extracted.

$$\begin{pmatrix} 1 & \mathrm{sinc}\!\left(\frac{\omega_1-\omega_2}{2}T\right) \\ \mathrm{sinc}\!\left(\frac{\omega_1-\omega_2}{2}T\right) & 1 \end{pmatrix}\!\begin{pmatrix} a_1 e^{jp_1} \\ a_2 e^{jp_2} \end{pmatrix} -$$
$$\begin{pmatrix} \mathrm{sinc}(\omega_1 T) & \mathrm{sinc}\!\left(\frac{\omega_1+\omega_2}{2}T\right) \\ \mathrm{sinc}\!\left(\frac{\omega_1+\omega_2}{2}T\right) & \mathrm{sinc}(\omega_2 T) \end{pmatrix}\!\begin{pmatrix} a_1 e^{-jp_1} \\ a_2 e^{-jp_2} \end{pmatrix} =$$
$$2j\begin{pmatrix} \langle s(t), e^{j\omega_1 t}\rangle \\ \langle s(t), e^{j\omega_2 t}\rangle \end{pmatrix} \quad (1)$$

In Equation (1), sinc(x) represents a sampling function defined by "sinc(x)=(sinx)/x", $\omega_1$ and $\omega_2$ represent angular frequencies defined by "$\omega_1=2\pi f_1$" and "$\omega_2=2\pi f_2$", respectively, $f_1$ and $f_2$ represent frequencies of the frequency signals generated by the frequency-signal generating unit, T represents a length of time for extracting the communication signals, e represents a base of a natural logarithm, j represents an imaginary unit, $p_1$ and $p_2$ represent a phase corresponding to the frequency signal of the frequency $f_1$ and a phase corresponding to the frequency signal of the frequency $f_2$, respectively, s(t) is a function representing a waveform of the communication signals defined as "$s(t)=a_1 \sin(\omega_1 t+p_1)+a_2 \sin(\omega_2 t+p_2)$", $a_1$ and $a_2$ represent an amplitude corresponding to the frequency signal of the frequency $f_1$ and an amplitude corresponding to the frequency signal of the frequency $f_2$, respectively, t represents a variable indicating a time, and $\langle s(t), e^{j\omega_1 t}\rangle$ and $\langle s(t), e^{j\omega_2 t}\rangle$ represent an inner product of s(t) and $e^{j\omega_1 t}$ and an inner product of s(t) and $e^{j\omega_2 t}$, respectively.

Next, the receiver obtains a time point at which the phases are in a predetermined relationship based on the plural phases extracted at step S-5, and determines the obtained time point as the time reference point (step S-6: a time-reference-point determining step). In other words, the plural pieces of phase information extracted at step S-5 are compared, and the time point at which these pieces of phase information are at a predetermined condition is determined as the time reference point.

The basic principle of the embodiment is as described above. The receiver can also set a reading starting point as a time point at which the reading of communication signals is started, based on the time reference point determined at step S-6 and a predetermined time length, and communication signals of a predetermined time length from the set reading starting time point can be read from the communication signals received at step S-4. In this case, the receiver extracts plural phases by executing the process at step S-5 again based on the read communication signals, and determines the time reference point by executing again the process at step S-6 based on the extracted plural phases. Because the extraction place of waveforms and the length in the phase extracting process are arbitrary, the influence of noise can be effectively avoided by excluding the influence of transient response at the beginning of waveforms in the phase extracting process and by using with priority a part of large amplitude. In other words, a high-precision determining process can be performed by avoiding parts having the influence of transient response and noise in the received waveforms. Because the waveform used for the detection can be relatively short, high-speed detection becomes possible, and detection errors due to multipath interference can be decreased.

At step S-5, phases of the frequencies contained in the communication signals and angular frequencies of the frequency signals contained in the communication signals can be extracted based on the received communication signals, and at step S-6, a time point at which the phases are in a predetermined relationship can be obtained based on the plural phases and the plural angular frequencies that are extracted, and the obtained time point can be determined as the time reference point. Specifically, when a communication signal is a combination of two frequency signals, the receiver can obtain a time point at which the phases of the two frequency signals coincide with each other, based on a phase difference at an observed arbitrary time point, using Equation (6) described later, and the obtained time point can be determined as the time reference point. Accordingly, the time reference point can be determined in a short time with high precision.

At step S-3, the plural frequency signal combined at step S-2 can be transmitted to the receiver as communication signals, using an ultrasonic wave, an electromagnetic wave, or light. Specifically, the plural frequency signals of which phases are arranged at step S-2 can be transmitted as communication signals of direct carriers, using an ultrasonic wave, an electromagnetic wave, or light. Alternatively, the plural frequency signals of which phases are arranged at step S-2 can be transmitted as communication signals that are modulated with carriers of other frequency, using an ultrasonic wave, an electromagnetic wave, or light. At step S-4, the communication signals transmitted from the transmitter can be received using an ultrasonic wave, an electromagnetic wave, or light. Specifically, the communication signals of direct carriers transmitted from the transmitter can be received using an ultrasonic wave, an electromagnetic wave, or light, or the modulated communication signals transmitted from the transmitter can be received using an ultrasonic wave, an electromagnetic wave, or light, and demodulated.

That is, the embodiment can be applied to all which can be expressed in the linear wave such as an ultrasonic wave, an electromagnetic wave, and light.

At step S-5, the amplitude information (amplitude reference information) as well as the phase information can be extracted. Accordingly, quadrature amplitude modulation by plural carriers can be efficiently demodulated.

Figure 3:
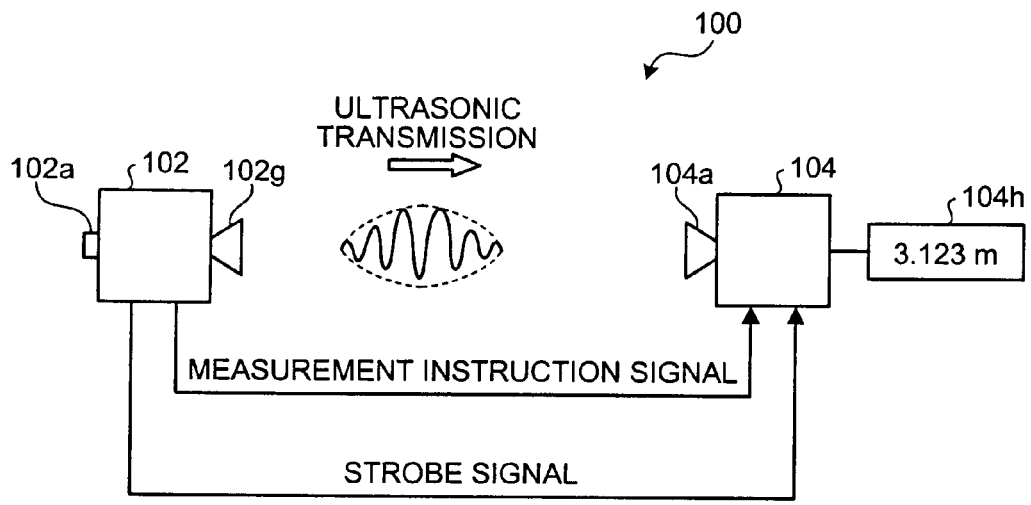
FIG. 3 is a schematic diagram of one example of a configuration of an ultrasonic distance measuring system.

A configuration of an ultrasonic distance measuring system 100 to which the time reference point information transmitting system of the embodiment is applied is explained with reference to FIG. 3. FIG. 3 is a schematic diagram of one example of the configuration of the ultrasonic distance measuring system 100.

As shown in FIG. 3, the ultrasonic distance measuring system 100 includes a transmitting node (transmitter) 102, and a receiving node (receiver), and transmits information concerning a time reference point from the transmitting node 102 to the receiving node 104, in an ultrasonic wave using a communication path in which communications can be carried out in a predetermined frequency band (for example, a communication path in which a frequency band that can be used for communications is constrained for reasons that a phase transmission characteristic and an amplitude transmission characteristic change due to a frequency, and the like).

Figure 4:
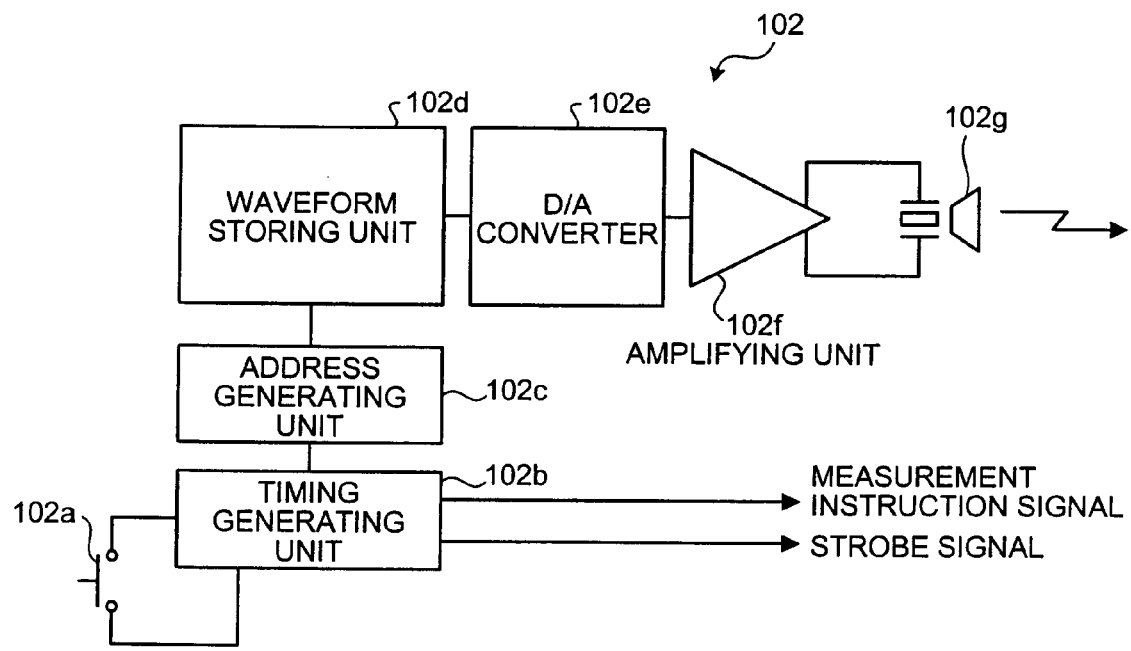
FIG. 4 is a block diagram of one example of a detailed configuration of a transmitting node shown in FIG. 3.

The transmitting node 102 mainly generates plural frequency signals that can be communicated in the communication path, determines a time point at which phases of the frequency signals coincide based on the generated plural frequency signals, defines the determined time point as a time reference point, aligns the phases of the frequency signals based on the defined time reference point, combines the plural frequency signals after the phase adjustment, and transmits the combined plural frequency signals to the receiver as communication signals in an ultrasonic wave. One example of a detailed configuration of the transmitting node 102 is explained with reference to FIG. 4. FIG. 4 is a block diagram of one example of the detailed configuration of the transmitting node 102. As shown in FIG. 4, the transmitting node 102 includes a measurement instruction switch 102a, a timing generating unit 102b, an address generating unit 102c, a waveform storing unit (waveform ROM) 102d, a D/A converter 102e, an amplifying unit 102f, and an ultrasonic transmitting element 102g, and these units are connected to each other via an arbitrary communication path.

The measurement instruction switch 102a is a switch that a user operates to instruct a measuring of a distance. The timing generating unit 102b reads combined waveforms obtained by adjusting (arranging) in advance the phases of the waveforms corresponding to the plural frequency signals, from the waveform storing unit 102d described later, starts transmitting the combined waveforms, and electrically transmits the measurement instruction signal for instructing a start of measuring a distance, and a strobe signal to be used to calculate a propagation delay time of the ultrasonic wave, to the receiving node 104. The address generating unit 102c generates a memory reading address by matching a sample frequency. The waveform storing unit 102d stores the combined waveforms having a combination of the phases of the waveforms corresponding to the plural frequency signals, by adjusting (arranging) the phases in advance. The D/A converter 102e converts a digital signal into an analog signal. The amplifying unit 102f amplifies the analog signal. The ultrasonic transmitting element 102g is a commercially available piezoelectric ceramic oscillator. The element is an oscillator. Therefore, the element has satisfactory communication sensitivity and a satisfactory signal-to-noise ratio, but has a narrow communication band of about 39.0 to 41.0 kHz. The amplitude and phase transmission characteristics have strong frequency dependency within the communication band.

Figure 5:
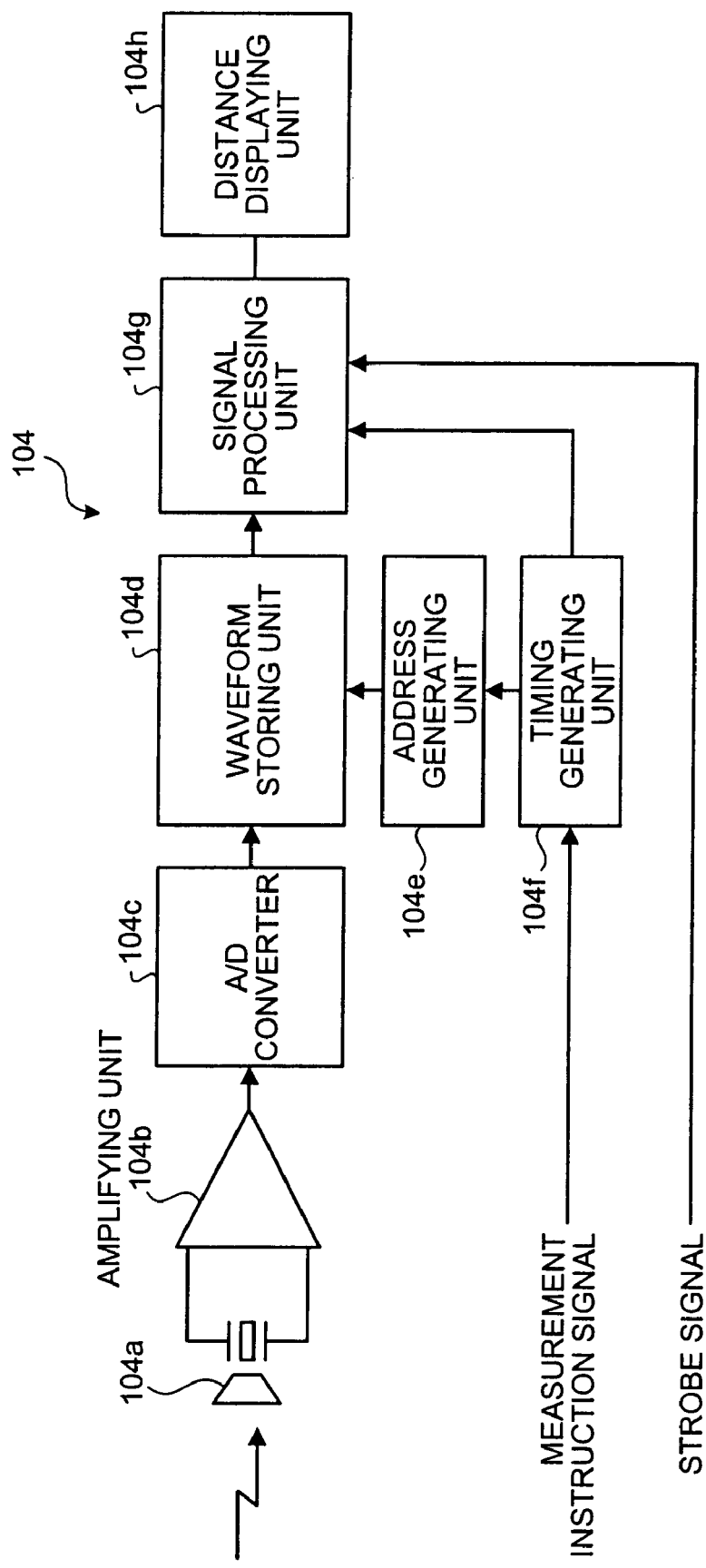
FIG. 5 is a block diagram of one example of a detailed configuration of a receiving node shown in FIG. 3.

Referring back to FIG. 3, the receiving node 104 mainly receives the communication signals transmitted from the transmitting node 102, in an ultrasonic wave, extracts the phases of the frequency signals contained in the communication signals, based on the received communication signals, obtains a time point at which the phases are in a predetermined relationship based on the extracted plural phases, and determines the obtained time point as a time reference point. One example of a detailed configuration of the receiving node 104 is explained with reference to FIG. 5. FIG. 5 is a block diagram of one example of the detailed configuration of the receiving node 104. As shown in FIG. 5, the receiving node 104 includes an ultrasonic receiving element 104a, an amplifying unit 104b, an A/D converter 104c, a waveform storing unit (waveform memory) 104d, an address generating unit 104e, a timing generating unit 104f, a signal processing unit (signal processing processor) 104g, and a distance displaying unit 104h, and these units are connected to each other via an arbitrary communication path.

The ultrasonic receiving element 104a is specifically a commercially available piezoelectric ceramic oscillator. The amplifying unit 104b amplifies the communication signals (analog signals) received by the ultrasonic receiving element 104a. The A/D converter 104c converts an analog signal into a digital signal. The waveform storing unit 104d stores waveforms of the received communication signals and a waveform of the electrically transmitted strobe signal. The address generating unit 104e generates a memory storage address combined with a sampling frequency. The timing generating unit 104f obtains a measurement instruction signal transmitted from the transmitting node 102. The signal processing unit 104g obtains the communication signals stored in the waveform storing unit 104d, extracts individual pieces of phase information by decomposing the frequency component of the communication signals, compares the extracted plural pieces of phase information with each other, determines a time point at which the compared pieces of phase information coincide as a time reference point, calculates a propagation delay time between the determined time reference point and the propagation time of the electrically transmitted strobe signal, and calculates a distance between the transmitting node 102 and the receiving node 104. The distance displaying unit 104h displays the distance between the transmitting node 102 and the receiving node 104 calculated by the signal processing unit 104g.

Processes that the transmitting node 102 and the receiving node 104 that constitute the ultrasonic distance measuring system 100 perform in the above configuration are explained in order with reference to FIG. 6 and FIG. 7.

First, the process that is performed by the transmitting node 102 is explained with reference to FIG. 6. FIG. 6 is a flowchart of one example of the process performed by the transmitting node 102.

The timing generating unit 102b monitors whether the measurement instruction switch 102a is depressed (that is, whether there is a measurement instruction). When there is a measurement instruction (YES at step SA-1), the timing generating unit 102b drives the measurement instruction signal (step SA-2).

Next, the timing generating unit 102b starts the timing generating circuit (step SA-3).

The timing generating unit 102b reads combined waveforms ("S(t)=sin $\omega_1$t+sin $\omega_2$t" (where $\omega_1$=2$\pi$f$_1$, $\omega_2$=2$\pi$f$_2$, and f$_1$ and f$_2$ are frequencies) from the waveform storing unit 102d. The D/A converter 102e converts the frequency signal of the combined waveforms into an analog signal. The amplifying unit 102f amplifies the analog signal, and the ultrasonic transmitting element 102g transmits the amplified signal in an ultrasonic wave (step SA-4).

On the other hand, the timing generating unit 102b monitors the timing at which the combined waveforms are read. When the time reference point (for example, a time when the phase difference "$\phi_2$-$\phi_1$" becomes 0) is transmitted (YES at step SA-5), the timing generating unit 102b momentarily generates a strobe signal, and electrically transmits the strobe signal to the receiving node 104 together with the measurement instruction signal (step SA-6). When the waveform of the range of "−1 ms≦t≦1 ms", is transmitted, the time reference point (the time when "$\phi_2$-$\phi_1$=0") is transmitted at the center of the waveform.

The process performed by the transmitting node 102 is as explained above.

The process performed by the receiving node 104 is explained next with reference to FIG. 7. FIG. 7 is a flowchart of one example of the process performed by the receiving node 104.

First, the timing generating unit 104f monitors whether the measurement instruction signal transmitted from the transmitting node 102 is obtained. When the measuring instructing signal is obtained (YES at step SB-1), the timing generating circuit is started. The amplifying unit 104b amplifies the communication signals received by the ultrasonic receiving element 104a, and the A/D converter 104c converts the amplified communication signals into digital signals, and stores the digital signals into the waveform storing unit 104d (step SB-2). The bit resolution of the A/D conversion and the time resolution affect the precision of the reproduced time reference point. Specifically, satisfactory bit resolution and time resolution can be obtained by carrying out the 8-bit linear quantization and the A/D conversion at each 1M sample/second.

Next, the timing generating unit 104f starts the signal processing unit 104g. The signal processing unit 104g reads the communication signals stored in the waveform storing unit 104d, by only a predetermine time length (T) (for example, T=1 ms) (step SB-3).

The signal processing unit 104g decomposes the frequency component of the communication signals read out by only the time period T at step SB-3, extracts individual pieces of phase information, compares the extracted phase information, and provisionally determines the time point at which the individual pieces of phase information become in a predetermined condition as the time reference point (step SB-4).

Because the communication signals are the superimposition of carriers of the plural frequencies, the phases of the signals of each element are separated at steps (1) to (4), and the time reference point is estimated at step (5). The data (numerical row) read at step SB-3 is handled as vector (s).

(1) A complex sinusoidal wave signal $e_1(t)$ of the frequency $f_1$ defined by Equation (2) and a complex sinusoidal wave signal $e_2(t)$ of the frequency $f_2$ defined by Equation (3) are arithmetically generated. The receiving node 104 already knows the frequencies $f_1$ and $f_2$ used in the transmitting node 102. A symbol j represents an imaginary unit in Equations (2) and (3):

$$e_1(t)=\exp(j\omega_1(t-T/2))=\cos \omega 1(t-T/2)+j \sin \omega 1(t-T/2) \quad (2)$$

$$e_2(t)=\exp(j\omega_2(t-T/2))=\cos \omega 2(t-T/2)+j \sin \omega 2(t-T/2) \quad (3)$$

(2) The complex sinusoidal wave signals $e_1(t)$ and $e_2(t)$ are sampled by matching the time length T, and complex vectors $e_1$ and $e_2$ are calculated. The complex vectors $e_1$ and $e_2$ are calculated only once.

(3) The inner product $<s, e_1>$ of the vectors s and $e_1$ defined by Equation (4), and the inner product $<s, e_2>$ of the vectors s and $e_2$ defined by Equation (5) are calculated:

$$\langle s,e_1 \rangle =(1/N) \times \Sigma(s_i \times \overline{e}_{1i}) \quad (4)$$

$$\langle s,e_2 \rangle =(1/N) \times \Sigma(s_i \times \overline{e}_{2i}) \quad (5)$$

In the above equations, $e_{1i}$ (with an overline) and $e_{2i}$ (with an overline) are a complex conjugate of $e_{1i}$ and a complex conjugate of $e_{2i}$, respectively. N represents a dimensional number of each vector, and is determined as "N=TS" from the time length T and the sample speed S. (4) When the received communication signal is assumed as "$s(t)=a_1 \sin(\omega t+p_1)+a_2 \sin(\omega_2 t+p_2)$", the phases (the phases $p_1$ and $p_2$) are extracted using Equation (1). The phases $p_1$ and $p_2$ are the phases of angular frequencies at the center of the time length T, and are the amounts to be obtained by separating from the combined waveforms. Not only the phases (the phases $p_1$ and $p_2$), the amplitudes (the amplitudes $a_1$ and $a_2$) can be also extracted.

$$\begin{pmatrix} 1 & \mathrm{sinc}\left(\frac{\omega_1-\omega_2}{2}T\right) \\ \mathrm{sinc}\left(\frac{\omega_1-\omega_2}{2}T\right) & 1 \end{pmatrix} \begin{pmatrix} a_1 e^{jp_1} \\ a_2 e^{jp_2} \end{pmatrix} - \\ \begin{pmatrix} \mathrm{sinc}(\omega_1 T) & \mathrm{sinc}\left(\frac{\omega_1+\omega_2}{2}T\right) \\ \mathrm{sinc}\left(\frac{\omega_1+\omega_2}{2}T\right) & \mathrm{sinc}(\omega_2 T) \end{pmatrix} \begin{pmatrix} a_1 e^{-jp_1} \\ a_2 e^{-jp_2} \end{pmatrix} = \\ 2j \begin{pmatrix} \langle s(t), e^{j\omega_1 t}\rangle \\ \langle s(t), e^{j\omega_2 t}\rangle \end{pmatrix} \quad (1)$$

In Equation (1), sinc(x) represents a sampling function defined by "sinc(x)=(sinx)/x", ($\omega_1$ and $\omega_2$ represent angular frequencies defined by "$\omega_1=2\pi f_1$" and "$\omega_2=2\pi f_2$", respectively, $f_1$ and $f_2$ represent frequencies of the frequency signals generated by the frequency-signal generating unit, T represents a length of time for extracting the communication signals, e represents a base of a natural logarithm, j represents an imaginary unit, $p_1$ and $p_2$ represent a phase corresponding to the frequency signal of the frequency $f_1$ and a phase corresponding to the frequency signal of the frequency $f_2$, respectively, s(t) is a function representing a waveform of the communication signals defined as "$s(t)=a_1 \sin(\omega_1 t+p_1)+a_2 \sin(\omega_2 t+p_2)$", $a_1$ and $a_2$ represent an amplitude corresponding to the frequency signal of the frequency $f_1$ and an amplitude corresponding to the frequency signal of the frequency $f_2$, respectively, t represents a variable indicating a time, and $<s(t), e^j(\omega^{1t})>$ and $<s(t), e^j\omega^{2t}>$ represent an inner product of s(t) and $e^j\omega^{1t}$ and an inner product of s(t) and $e^j\omega^{2t}$, respectively.

(5) By comparing the extracted phases, a time point at which the extracted phases are in a predetermine condition is provisionally determined as the time reference point. Specifically, the time reference point t is estimated from Equation (6) based on the phases $p_1$ and $p_2$. The center time of the time length T is set as "t=0", and the time at which "$p_2-px_1=0$" is set as the time reference point.

$$t=-(p_1-p_2)/(\omega_1-\omega_2)=-(p_1-p_2)/(2\pi(f1-f2)) \quad (6)$$

Referring back to the explanation of the flowchart in FIG. 7, the signal processing unit 104g resets the starting time of the time length T so that the time reference point provisionally determined at step SB-4 becomes at near the center, and reads the communication signal by only the time length T from the reset starting time, in a similar manner to that at step SB-3 (step SB-5).

Next, the signal processing unit 104g determines again the time reference point, in a similar manner to that at step SB-4 (step SB-6). Theoretically, the same time reference point is obtained even when any part of the received beat wavelength s(t) is read. However, an error due to the transient response of the element is present near the time point at which the waveform is started. The amplitudes at both ends of the beat waveform are small, and the influence of background noise is easily received. Therefore, the time reference point is once estimated at step SB-4, and the starting time of the time length T is set again so that the time becomes near the center, thereby calculating the time reference point. A result of satisfactory reproducibility can be obtained by using the time reference point obtained in the second calculation.

Next, the signal processing unit 104g calculates a propagation delay time between the time reference point determined at step SB-6 and the strobe signal, and determines a distance between the transmitting node 102 and the receiving node 104, based on the calculated propagation delay time and the speed of the ultrasonic wave (step SB-7).

The explanations of the process performed by the receiving node 104 is thus completed.

In the ultrasonic distance measuring system 100 according to the present embodiment, the transmitting node 102 can always transmit the measurement instruction signal and the strobe signal to the receiving node 104, and the receiving node 104 can receive these signals when the receiving node 104 enters the communication range. That is, in the ultrasonic distance measuring system 100, the transmitting node 102 is always operating, and the receiving node 104 can start measuring the signals transmitted from the transmitting node 102, when the receiving node 104 enters the communication area.

As explained in detail above, according to the time reference point information transmitting system of the embodiment, the transmitter generates plural frequency signals that can be communicated in a communication path. The transmitter determines a time point at which phases of the frequency signals are in a predetermined relationship based on the plural frequency signals, defines the determined time point as the time reference point, and aligns the phases of the frequency signals based on the defined time reference point. The transmitter combines the plural frequency signals of which phases are aligned, and transmits the combined plural frequency signals to the receiver as communication signals. The receiver receives the communication signals transmitted from the transmitter, and extracts phases of the frequency signals contained in the communication signals, based on the received communication signals, obtains a time point at which the phases are in a predetermined relationship based on the extracted plural phases, and determines the obtained time point as the time reference point. With this arrangement, even when a low-price narrow-band transmitting/receiving element is used, the time reference point can be transmitted with high precision and in a short time, by suppressing the influence of the distortion of a received waveform.

The background of the development of the embodiment is explained below again.

In the communication system, there are many situations where timing information is required to be strictly transmitted and measured at a high speed. For example, in the image communication, there is a situation of synchronizing horizontal and vertical scanning. In the synchronous digital data communication, there is a situation of detecting a timing of changing over bit information. In the field of measuring, there are a radar, laser, and ultrasonic measuring device that measure a distance and an angle based on a signal delay time. Measuring precision of a distance and an angle basically depends on in what strict precision the timing information can be detected.

The communication system and the measuring system transmit a timing signal based on the wave phenomenon of electromagnetic waves that are propagated in space, an optical fiber, a waveguide, and a communication cable, and waves that are propagated in gas, liquid, and solid. Assume that a waveform generator, a wave propagation medium, and a waveform receiver that are used in the above systems have a sufficiently uniform amplitude transmission characteristic and a sufficiently uniform phase transmission characteristic in a wide frequency region. In this case, timing information can be accurately and easily transmitted. Timing information to be transmitted can be expressed using a leading edge of a rectangular electric signal pulse or a leading edge of a rectangular ultrasonic burst.

The signals described above have a limitless spread in a frequency spectrum. On the other hand, the existing transmitting and receiving mechanism and a medium have a nonuniform amplitude frequency characteristic and a nonuniform phase frequency characteristic to some extent. Therefore, a rectangular electric signal pulse and a rectangular ultrasonic burst are deformed at the receiving edge. Particularly, in a remote-distance communication system, and a communication system that need to use a waveform conversion device or a wave propagation medium having a poor frequency characteristic, it is difficult to strictly transmit timing information. This becomes obvious as a limit of the information communication speed.

In the field of the measuring device that obtains a distance and an angle by measuring a signal delay time, precision of the timing measuring directly appears as a distance meter measuring error. For example, there is an ultrasonic distance meter that measures a distance between a transmitter and a receiver by detecting an envelope line leading edge of 40 kHz carrier burst. The ultrasonic distance meter uses many piezoelectric ceramic element for a transmitting and receiving element of an ultrasonic wave. Because the piezoelectric ceramic element has particularly an inferior (narrowband) frequency characteristic, the receiving wave strongly receives a distortion. Representative precision of this type of measuring unit is a few centimeters to a few tens of centimeters. In terms of a speed of wave propagated in the air, 0.1 ms to 1 ms can be said to be a representative value of precision that can be achieved using an envelope line of a waveform passing through a narrow-band communication path, in the timing detection of the 40 kHz ultrasonic burst waveform.

The envelope line system uses a region that receives a strong influence of a transient response characteristic of a signal such as a leading edge of the ultrasonic burst. Therefore, a characteristic variation of the element easily gives influence to the measuring precision and the transmission precision of timing information. Accordingly, the precision often needs to be aligned to compensate for the difference between devices.

The envelope line of a waveform receives both influences of the amplitude frequency characteristic and the phase frequency characteristic of a transmission path. Therefore, the influence of these characteristics applied to the envelope line shape is large. When timing can be transmitted using only the phase information, there is a possibility of being able to carry out communications in higher precision. However, information transmission based on phase information has a problem in that a phase needs to be extracted from a cycle phenomenon such as a sinusoidal wave. Because a waveform is repeated in a phase value of $2\pi$ radian, a phase obtained at the receiving end becomes a surplus obtained after dividing the absolute value of the phase by $2\pi$.

The wavelength of an ultrasonic wave of 40 kHz is about 8.5 mm in the air and this corresponds to $2\pi$ radian of a phase value. When a distance is attempted to be determined by extracting the phase, only a remainder obtained by dividing the distance by the wavelength of 8.5 mm is obtained and the absolute value of a distance cannot be measured. Accordingly, a practical distance meter cannot be obtained. However, the usage of obtaining an angle of a signal source by measuring a distance at relatively close two points and by obtaining a phase difference can be achieved even when there is uncertainty of $2\pi$ radian. Therefore, this angle meter is practically used.

A displacement meter that is sufficient to obtain only displacement between a narrow distance can have uncertainty of 8.5 mm cycle in the air is some cases. A micro displacement meter having measuring precision of around 1 mm is put into practical use using this method.

Japanese Patent Application Laid-open No. 2004-191145 discloses the invention that an ultrasonic displacement using a phase has a measuring range exceeding 8.5 mm. According to this method, a phase delay measuring using two different frequencies $f_1$ and $f_2$ (where $f_1 > f_2$) is carried out twice by changing over frequencies, thereby obtaining phases $\phi_1$ and $\phi_2$. The phases $\phi_1$ and $\phi_2$ are further examined to substantially obtain the effect that the phase measuring is achieved by using the frequency of $f_1$-$f_2$. For example, by measuring the phases by changing over between the frequencies 40 kHz and 39 kHz as $f_1$ and $f_2$, the effect of substantially measuring phases in the carrier of 40−39=1 kHz. With this arrangement, the uncertainty of the distance of the displacement meter can be extended to 340 mm as the wavelength of the wave of 1 kHz.

Even when the wavelength is expanded in this way, there still remains timing uncertainty due to the phase cycle. Measuring needs to be carried out at plural times by changing over frequencies, and the measuring time becomes long. Precision further decreases when the measured object moves during this period and when the transmission medium changes due to a wind direction and atmospheric temperature. Therefore, while the displacement can be used for the object which is relatively static in the adjusted environment, this displacement meter is not suitable for the distance meter requiring an absolute distance and for the object in the outdoors and moving at a high speed.

The problem of a multipath is present in the timing transmission that uses phases of an electromagnetic wave and an acoustic wave propagating in space. When there is an object that reflects, diffracts, and scatters the electromagnetic wave and the acoustic wave in the propagation space, both a direct wave from the transmitting end and an indirect wave that is reflected and diffracted from the object reach the receiving end, and decrease the timing precision. Consideration needs to be given to the multipath in the timing transmission.

It is often desired in the communication application to accurately transmit a timing in the communication path (total of a transmitter, a signal medium, and a receiver) of which band is limited. Particularly, there is an ultrasonic distance meter using a piezoelectric ceramic oscillator of 40 kHz. In this case, while it is the object of communication to transmit the accurate timing using a transmittable waveform, a system using a waveform envelope line is used, and constraints are not necessarily sufficiently examined, resulting in poor detection precision. It often takes time in adjusting the compensation for an instrumental error.

The method using phases of a carrier has timing detection precision exceeding that of the method using the envelope line. However, this method has uncertainty in the determination of a phase $2\pi$ radian (cycle in the case of time, and a waveform in the case of distance). Although the method using phases can be used for the detector of short-distance displacement, the method cannot be used for a distance meter that obtains a general timing transmission or an absolute distance. The method also has strong influence of a multipath.

As a result of performing a detailed examination through the process described above, the present inventors have found a setting of a specific time reference point in the communication waveform. In the embodiment, communications are carried out in the state that plural carriers which can be transmitted in a narrow-band communication path are superimposed simultaneously. The transmitting unit strictly controls the phase of each element carrier so that the phases match at only a specific timing. This timing is set as a time reference point. The receiving unit receives a signal having each frequency combined, separates carriers by operation, and detects phases. By calculating a timing at which the phases coincide, this timing is set as a time reference point. With this arrangement, at the time reference point, communications can be achieved in a narrow-band communication path having only poor amplitude frequency characteristic and poor phase frequency characteristic. Communications can be achieved in a short time. Timing precision that exceeds the precision of the envelope line system and matches the phase system can be obtained. Uncertain timing of the phase cycle observed in the phase system can be avoided, and there is little influence of the multipath.

According to the time reference point information transmitting system, the receiver extracts individual pieces of phase information by decomposing the frequency component of received communication signals, based on Equation (1). Accordingly, by handling only frequencies concerning the information transmission without depending on the general FFT, influence of noise can be decreased, and high-speed detecting operation can be achieved. By obtaining the amplitude standard of individual carriers from Equation (1), the quadrature amplitude modulation using plural carriers can be efficiently demodulated. As compared with the frequency resolution method based on the conventional FFT, the method makes it possible to extract phase information and amplitude information of element frequencies at high speed and with high precision.

When the embodiment is applied as a data communicating system, a strict time reference point can be obtained from the embodiment. Therefore, an asynchronous communication method having good performance can be achieved by extracting subsequent bit information by matching the time reference point. A phase reference and an amplitude reference can be obtained (see Equation (1)) by matching the time reference point. Therefore, these references can be used as reference signals of digital demodulation when data is expressed by phase amplitude modulation.

More specifically, the time reference point can be obtained by matching phases, and further the amplitudes ($a_1$ and $a_2$ in Equation (1)) and the phases ($p_1$ and $p_2$ in Equation (1)) can be obtained, from the synchronization pattern based on carrier superimposition of plural frequencies. These can be used as references in demodulating the general digital communications. That is, when the synchronization pattern is positioned at the header of the quadrature amplitude modulation (QAM modulation), the amplitudes ($a_1$ and $a_2$) obtained from the synchronization pattern can be used for the reference amplitudes to carry out demodulation. The phases ($p_1$ and $p_2$) obtained from the synchronization pattern can be used for the reference phases. The division of a data packet into a symbol unit can be carried out very precisely using the time reference point when the symbol rate (the bit rate) is fixed. Accordingly, highly reliable data demodulation can be carried out.

According to the time reference point information transmitting system, the receiving unit sets a reading starting time point as a time point at which communication signals are started to be read based on a determined time reference point and a predetermined time length, reads communication signals of a predetermined time length from the set reading starting time point, from the received communication signals, extracts plural phases again based on the read communication signals, and determines the time reference point again based on the extracted plural phases. Because the extraction place of waveforms and the length in the phase extracting process are arbitrary, the influence of noise can be effectively avoided by excluding the influence of transient response at the beginning of waveforms and by using with priority a part of large amplitude. The waveform used for the detection can be relatively short. Therefore, high-speed detection becomes possible, and detection error due to multipath interference can be decreased.

According to the time reference point information transmitting system, the receiver extracts the phase of each frequency signal contained in the communication signal and the angular frequency of each frequency signal contained in the communication signal, based on the received communication signal, obtains a time point at which each phase is in a predetermined relationship based on the plural phases and the plural angular frequencies that are extracted, and determines the obtained time point as the time reference point. Specifically, when the communication signal is a combination of two frequency signals, for example, the receiver obtains a time point at which the phases of the two frequency signals coincide with each other, based on a phase difference at an observed arbitrary time point, using Equation (6), and determines the obtained time point as the time reference point. Accordingly, the time reference point can be determined in a short time and with high precision. This example physically corresponds to a measuring of a group delay time D in an equation "$D=\Delta p/\Delta \omega$" ($\Delta p$: phase difference, $\Delta \omega$: angular frequency difference), by regarding a pair of the transmitter and the receiver including an ultrasonic communication path (transmission path). The present inventors have found that the timing signal can be transmitted using a method equivalent to the measuring of a group delay time in the filter. The embodiment has a characteristic that a composite waveform of complex frequency is used to measure the phase difference $\Delta p$ which is necessary to determine the group delay time. Based on this characteristic, the time reference point is determined in a short time with high precision.

According to the time reference point information transmitting system, the transmitter transmits phase-arranged plural frequency signals as communication signals of direct carriers or as communication signals modulated by carriers of other frequency, using any one of an ultrasonic wave, an electromagnetic wave, and light. The receiver receives the communication signals of direct carriers or receives modulated communication signals, using any one of an ultrasonic wave, an electromagnetic wave, and light. With this arrangement, the embodiment can be applied to what can be expressed by a general linear wave.

The analysis of Equation (1) is explained below.

$$\begin{pmatrix} 1 & \sin c\left(\frac{\omega_1 - \omega_2}{2}T\right) \\ \sin c\left(\frac{\omega_1 - \omega_2}{2}T\right) & 1 \end{pmatrix} \begin{pmatrix} a_1 e^{jp_1} \\ a_2 e^{jp_2} \end{pmatrix} - \begin{pmatrix} \sin c(\omega_1 T) & \sin c\left(\frac{\omega_1 + \omega_2}{2}T\right) \\ \sin c\left(\frac{\omega_1 + \omega_2}{2}T\right) & \sin c(\omega_2 T) \end{pmatrix} \begin{pmatrix} a_1 e^{-jp_1} \\ a_2 e^{-jp_2} \end{pmatrix} = 2j \begin{pmatrix} \langle s(t), e^{j\omega_1 t} \rangle \\ \langle s(t), e^{j\omega_2 t} \rangle \end{pmatrix}$$ (1)

The equation shown in Equation (1) can be solved by the following method, for $a_1 e^{-jp_1} = a_1(\cos p_1 + j \sin p_1)$ and for $a_2 e^{-jp_2} = a_2(\cos p_2 + j \sin p_2)$.

First, a matrix A and a matrix B are defined as Equations (7) and (8) below. Equation (1) becomes two sets of equations (Equations (9) and (10)) regarding the real part and the imaginary part.

$$A = \begin{pmatrix} 1 & \sin c\left(\frac{\omega_1 - \omega_2}{2}T\right) \\ \sin c\left(\frac{\omega_1 - \omega_2}{2}T\right) & 1 \end{pmatrix}$$ (7)

$$B = \begin{pmatrix} \sin c(\omega_1 T) & \sin c\left(\frac{\omega_1 + \omega_2}{2}T\right) \\ \sin c\left(\frac{\omega_1 + \omega_2}{2}T\right) & \sin c(\omega_2 T) \end{pmatrix}$$ (8)

$$(A - B)\begin{pmatrix} a_1 \cos p_1 \\ a_2 \cos p_2 \end{pmatrix} = 2\begin{pmatrix} \langle s(t), \sin \omega_1 t \rangle \\ \langle s(t), \sin \omega_2 t \rangle \end{pmatrix}$$ (9)

$$(A + B)\begin{pmatrix} a_1 \sin p_1 \\ a_2 \sin p_2 \end{pmatrix} = 2\begin{pmatrix} \langle s(t), \cos \omega_1 t \rangle \\ \langle s(t), \cos \omega_2 t \rangle \end{pmatrix}$$ (10)

When Equations (9) and (10) are solved, the real part and the imaginary part of $a_1 e^{-jp_1}$ and $a_2 e^{-jp_2}$ are obtained.

Finally, the arguments of the complex numerical values of $a_1 e^{-jp_1}$ and $a_2 e^{-jp_2}$ are obtained, and the phases $p_1$ and $p_2$ are obtained. By obtaining the absolute values, the amplitudes $a_1$ and $a_2$ are obtained.

The phases $p_1$ and $p_2$ correspond to the phase transmission characteristics, and the time reference point can be reproduced from the coincidence time.

Equation (1) is the expression for analyzing the composite wave (communication signals) of two frequency signals. Therefore, Equation (1) uses a 2×2 matrix. The embodiment exhibits high performance (such as the extraction speed and the extraction precision) regarding the extraction of phases in many usages, by using Equation (1). In analyzing the composite wave having n frequency signals combined, Equation (1) can be expanded to use an n×n matrix. Those skilled in the art can easily carry out the expansion.

In the present embodiment, a distance between the transmitting node 102 and the receiving node 104 is measured using the ultrasonic distance measuring system 100 in the embodiment. As a result of experiments, a measured value within an error of 1 mm was able to be obtained in the distance of 3 m. This measured value has relatively high precision (error of one over the number of wavelength) considering that the wavelength of an ultrasonic wave in the air is 8.5 mm. This result indicates that the time reference point was able to be transmitted with the precision of about ±3 μs, and this is difficult to be achieved by the conventional envelope line detection. In the embodiment, uncertainty of transmission of timing information based on the phase cycle as the problem of the method using phases is not present. When the system is operated as a distance meter, according to the embodiment, a distance can be continuously measured from 0 m to about 10 m (measurement limit due to the attenuation of an acoustic wave). Further, according to the embodiment, only a beat waveform of about 2 ms is received in the measuring of a distance. Therefore, the time reference point can be transmitted and the distance can be measured in a remarkably short time.

The beat waveform that is transmitted in the embodiment is present as only a wave packet of about 70 cm (in the case of the ultrasonic wave of 40 kHz) in space. Therefore, according to the embodiment, even when a barrier is present, only a direct wave is sensed when a channel difference is 70 cm, and the measuring precision can be maintained without receiving the influence of a multipath. When the frequency of the ultrasonic wave is increased, the time reference point can be transmitted and the distance can be measured without more receiving the influence of the channel difference. Further, according to the embodiment, when a channel difference is to be compensated, it is sufficient to compensate for only the phase characteristic in the specific frequency.

According to the embodiment, a transmitter transmits information on a time reference point to a receiver through a communication path in which a communication can be performed in a predetermined frequency band. The transmitter generates a plurality of frequency signals communicable through the communication path, determines a time point at which phases of the frequency signals coincide based on generated frequency signals, defines a determined time point as the time reference point, aligns the phases of the frequency signals based on a defined time reference point, combines the frequency signals of which the phases are aligned, and transmits combined frequency signals to the receiver as communication signals. The receiver receives the communication signals transmitted from the transmitter, extracts the phases of the frequency signals contained in the communication signals, based on received communication signals, obtains a time point at which the phases coincide based on extracted phases, and determines an obtained time point as the time reference point. Accordingly, there is an effect that even when a low-price narrow-band transmitting/receiving element is used, the time reference point can be transmitted with high precision and in a short time, by suppressing the influence of the distortion of a received waveform.

Furthermore, according to the embodiment, the receiver extracts the phases of the frequency signals contained in the communication signals, based on the received communication signals and Equation (1) Accordingly, there is an effect that the influence of noise can be decreased by handling only the frequency concerning the information transmission without depending on a general FFT. Further, high-speed detection operation becomes possible. By obtaining the amplitude standard of individual carriers from Equation (1), the quadrature amplitude modulation according to plural carriers can be efficiently demodulated. As compared with the conventional frequency resolution method using the FFT, the present method makes it possible to extract the phase information and the amplitude information of element frequencies with high precision at high speed.

Moreover, according to the embodiment, the receiver extracts the phases of the frequency signals contained in the communication signals and angular frequencies of the frequency signals contained in the communication signals, based on the received communication signals, obtains a time point at which the phases coincide based on the phases and extracted angular frequencies, and determines an obtained time point as the time reference point. Specifically, when a communication signal is a combination of two frequency signals, for example, the receiver obtains a time point at which the phases of the two frequency signals coincide with each other, from an equation "$t=-(p_1-p_2)/(\omega_{1-2})$" (where $p_1$ and $p_2$ denote phases, and $\omega_1$ and $\omega_2$ denote angular frequencies), based on a phase difference at an observed arbitrary time point, and determines the time point as a time reference point. Accordingly, there is an effect that the time reference point can be determined in a short time with high precision.

Furthermore, according to the embodiment, the transmitter transmits the combined plural frequency signals to the receiver as communication signals, using any one of an ultrasonic wave, an electromagnetic wave, and a light. The receiver receives the communication signals transmitted from the transmitter, using one of the ultrasonic wave, the electromagnetic wave, and the light. Accordingly, there is an effect that the embodiment can be applied to what can be expressed in the general linear wave.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A time reference point information transmitting system in which a transmitter transmits information on a time reference point to a receiver through a communication path in which a communication can be performed in a predetermined frequency band, comprising:
    the transmitter including
        a frequency-signal generating unit that generates a plurality of frequency signals communicable through the communication path,
        a phase adjusting unit that sets a value equal to or smaller than an inverse number of an absolute value of a difference between two frequency signals from among the frequency signals generated by the frequency-signal generating unit as a length of a time during which the communication signals are transmitted to the receiver, determines a time point at which the phases of the frequency signals coincide within a range of a set time length, defines a determined time point as the time reference point, and aligns the phases of the frequency signals based on a defined time reference point, and
        a transmitting unit that combines the frequency signals of which the phases are aligned by the phase adjusting unit, and transmits the combined frequency signals to the receiver by the length of the time as communication signals; and
    the receiver including
        a receiving unit that receives the communication signals transmitted from the transmitter,
        a phase extracting unit that extracts the phases of the frequency signals contained in the communication signals, based on the communication signals received by the receiving unit, and
        a time-reference-point determining unit that obtains a time point at which the phases coincide based on the phases extracted by the phase extracting unit, and determines an obtained time point as the time reference point.

2. The time reference point information transmitting system according to claim 1, wherein the phase extracting unit extracts the phases of the frequency signals contained in the communication signals, based on the communication signals received by the receiving unit and an equation defined by $$\begin{pmatrix} 1 & \sin c\left(\frac{\omega_1-\omega_2}{2}T\right) \\ \sin c\left(\frac{\omega_1-\omega_2}{2}T\right) & 1 \end{pmatrix} \begin{pmatrix} a_1 e^{jp_1} \\ a_2 e^{jp_2} \end{pmatrix} -$$

$$\begin{pmatrix} \sin c(\omega_1 T) & \sin c\left(\frac{\omega_1+\omega_2}{2}T\right) \\ \sin c\left(\frac{\omega_1+\omega_2}{2}T\right) & \sin c(\omega_2 T) \end{pmatrix} \begin{pmatrix} a_1 e^{-jp_1} \\ a_2 e^{-jp_2} \end{pmatrix} = 2j \begin{pmatrix} \langle s(t), e^{j\omega_1 t} \rangle \\ \langle s(t), e^{j\omega_2 t} \rangle \end{pmatrix},$$

where sinc(x) represents a sampling function defined by "sinc(x)=(sinx)/x", $\omega_1$ and $\omega_2$ represent angular frequencies defined by "$\omega_1=2\pi f_1$" and "$\omega_2=2\pi f_2$", respectively, $f_1$ and $f_2$ represent frequencies of the frequency signals generated by the frequency-signal generating unit, T represents a length of a time for extracting the communication signals, e represents a base of a natural logarithm, j represents an imaginary unit, $p_1$ and $p_2$ represent a phase corresponding to the frequency signal of the frequency $f_1$ and a phase corresponding to the frequency signal of the frequency $f_2$, respectively, s(t) is a function representing a waveform of the communication signals defined as "$s(t)=a_1 \sin(\omega_1 t+p_1)+a_2 \sin(\omega_2 t+p_2)$", $a_1$ and $a_2$ represent an amplitude corresponding to the frequency signal of the frequency $f_1$ and an amplitude corresponding to the frequency signal of the frequency $f_2$, respectively, t represents a variable indicating a time, and $<s(t), e^{j\omega_1 t}>$ and $<s(t), e^{j\omega_2 t}>$ represent an inner product of s(t) and $e^{j\omega_1 t}$ and an inner product of s(t) and $e^{j\omega_2 t}$, respectively.

3. The time reference point information transmitting system according to claim 1, wherein the phase extracting unit extracts the phases of the frequency signals contained in the communication signals and angular frequencies of the frequency signals contained in the communication signals, based on the communication signals received by the receiving unit, and the time-reference-point determining unit obtains the time point at which the phases coincide based on the phases and the angular frequencies extracted by the phase extracting unit, and determines the obtained time point as the time reference point.

4. The time reference point information transmitting system according to claim 1, wherein the transmitting unit transmits the combined frequency signals as the communication signals to the receiver, using any one of an ultrasonic wave, an electromagnetic wave, and a light, and the receiving unit receives the communication signals transmitted from the transmitter, using any one of the ultrasonic wave, the electromagnetic wave, and the light.

5. A receiver that receives information on a time reference point through a communication path in which a communication can be performed in a predetermined frequency band, the receiver comprising:

a receiving unit that receives, as communication signals, a plurality of frequency signals, which are combined, of which phases are aligned based on the time reference point defined as a time point at which the phases are in a predetermined relationship;

a phase extracting unit that extracts the phases of the frequency signals contained in the communication signals, based on the communication signals received by the receiving unit and an equation defined by $$\begin{pmatrix} 1 & \mathrm{sinc}\left(\frac{\omega_1-\omega_2}{2}T\right) \\ \mathrm{sinc}\left(\frac{\omega_1-\omega_2}{2}T\right) & 1 \end{pmatrix} \begin{pmatrix} a_1 e^{jp_1} \\ a_2 e^{jp_2} \end{pmatrix} -$$

$$\begin{pmatrix} \mathrm{sinc}(\omega_1 T) & \mathrm{sinc}\left(\frac{\omega_1+\omega_2}{2}T\right) \\ \mathrm{sinc}\left(\frac{\omega_1+\omega_2}{2}T\right) & \mathrm{sinc}(\omega_2 T) \end{pmatrix} \begin{pmatrix} a_1 e^{-jp_1} \\ a_2 e^{-jp_2} \end{pmatrix} = 2j \begin{pmatrix} \langle s(t), e^{j\omega_1 t}\rangle \\ \langle s(t), e^{j\omega_2 t}\rangle \end{pmatrix},$$

where sinc(x) represents a sampling function defined by "sinc(x)=(sinx)/x", $\omega_1$ and $\omega_2$ represent angular frequencies defined by "$\omega_1=2\pi f_1$" and "$\omega_2=2\pi f_2$", respectively, $f_1$ and $f_2$ represent frequencies of the frequency signals generated by the frequency-signal generating unit, T represents a length of a time for extracting the communication signals, e represents a base of a natural logarithm, j represents an imaginary unit, $p_1$ and $p_2$ represent a phase corresponding to the frequency signal of the frequency $f_1$ and a phase corresponding to the frequency signal of the frequency $f_2$, respectively, s(t) is a function representing a waveform of the communication signals defined as "$s(t)=a_1 \sin(\omega_1 t+p_1)+a_2 \sin(\omega_2 t+p_2)$", $a_1$ and $a_2$ represent an amplitude corresponding to the frequency signal of the frequency $f_1$ and an amplitude corresponding to the frequency signal of the frequency $f_2$, respectively, t represents a variable indicating a time, and $<s(t), e^{j\omega_1 t}>$ and $<s(t), e^{j\omega_2 t}>$ represent an inner product of s(t) and $e^{j\omega_1 t}$ it and an inner product of s(t) and $e^{j\omega_2 t}$, respectively; and a time-reference-point determining unit that obtains a time point at which the phases coincide based on the phases extracted by the phase extracting unit, and determines an obtained time point as the time reference point.

6. The time reference point information transmitting system according to claim 5, wherein the phase extracting unit extracts the phases of the frequency signals contained in the communication signals and angular frequencies of the frequency signals contained in the communication signals, based on the communication signals received by the receiving unit, and the time-reference-point determining unit obtains the time point at which the phases coincide based on the phases and the angular frequencies extracted by the phase extracting unit, and determines the obtained time point as the time reference point.

7. The time reference point information transmitting system according to claim 5, wherein the receiving unit receives the communication signals, using any one of an ultrasonic wave, an electromagnetic wave, and a light.

8. A time reference point information transmitting system in which a transmitter transmits information on a time reference point to a receiver through a communication path in which a communication can be performed in a predetermined frequency band, comprising:

the transmitter including a waveform storing unit that stores combined waveforms obtained by combining waveforms of which phases are aligned in advance, based on the time reference point defined as a time point at which the phases of the waveforms corresponding to a plurality of frequency signals communicable through the communication path coincide with each other, and a transmitting unit that transmits the frequency signals of the combined waveforms stored in the waveform storing unit to the receiver as communication signals; and the receiver including a receiving unit that receives the communication signals transmitted from the transmitter, a phase extracting unit that extracts the phases of the frequency signals contained in the communication signals, based on the communication signals received by the receiving unit, and a time-reference-point determining unit that obtains a time point at which the phases coincide based on the phases extracted by the phase extracting unit, and determines an obtained time point as the time reference point.

9. A time reference point information transmitting system in which a transmitter transmits information on a time reference point to a receiver through a communication path in which a communication can be performed in a predetermined frequency band, comprising:

the transmitter including a frequency-signal generating unit that generates a plurality of frequency signals communicable through the communication path, a phase adjusting unit that sets a value equal to or smaller than an inverse number of an absolute value of a difference between two frequency signals from among the frequency signals generated by the frequency-signal generating unit as a length of a time during which the communication signals are transmitted to the receiver, determines a time point at which the phases of the frequency signals coincide within a range of a set time length, defines a determined time point as the time reference point, sets a start time of the length of the time in such a manner that a defined time reference point is included in the communication signals, and aligns the phases of the frequency signals based on the time reference point, and a transmitting unit that combines the frequency signals of which the phases are aligned by the phase adjusting unit, and transmits combined frequency signals to the receiver by a length of the time from the start time as communication signals; and the receiver including a receiving unit that receives the communication signals transmitted from the transmitter, a phase extracting unit that extracts the phases of the frequency signals contained in the communication signals, based on the communication signals received by the receiving unit, and a time-reference-point determining unit that obtains a time point at which the phases coincide based on the phases extracted by the phase extracting unit, and determines an obtained time point as the time reference point.

* * * * *